United States Patent [19]
Ambasz

[11] Patent Number: 5,295,089
[45] Date of Patent: Mar. 15, 1994

[54] SOFT, FOLDABLE CONSUMER ELECTRONIC PRODUCTS

[76] Inventor: Emilio Ambasz, 295 Central Park West, New York, N.Y. 10024

[21] Appl. No.: 890,630

[22] Filed: May 28, 1992

[51] Int. Cl.⁵ .............................................. G06F 15/02
[52] U.S. Cl. .................................. 364/708.1; 361/681
[58] Field of Search ............... 364/708, 706; 235/1 D; 312/7.2, 20; 361/380

[56] References Cited

U.S. PATENT DOCUMENTS

| 4,703,160 | 10/1987 | Narishima et al. | 364/708 |
| 5,002,184 | 3/1991 | Lloyd | 235/1 D |
| 5,109,354 | 4/1992 | Yamashita | 364/708 |

FOREIGN PATENT DOCUMENTS

0073775  4/1985  Japan ..................... 364/706

*Primary Examiner*—Jerry Smith
*Attorney, Agent, or Firm*—Brumbaugh, Graves, Donohue & Raymond

[57] ABSTRACT

A soft foldable consumer electronic product comprises an envelope having a top member and a bottom member, each member being of soft flexible sheet material, a first unit of the electronic product received within a first portion of the envelope and affixed to one of the members thereof, a second unit of the electronic product received in a second portion of the envelope and affixed to one of the members thereof, and at least one conductor within the envelope extending from the first to the second portion and connecting the first and second units to electrically connect them for operation of the product. The envelope is foldable such that the positions of the first and second portions relative to each other can be changed selectively.

13 Claims, 9 Drawing Sheets

SOFT, FOLDABLE CONSUMER ELECTRONIC PRODUCTS

BACKGROUND OF THE INVENTION

Miniaturization of electronic components has made it possible to produce small, portable consumer electronic products of all sorts, such as radios, tape cassette players, disc players, telephones, television receivers, calculators and computers. The downsizing of those products from their larger-sized ancestors has included incorporating them into rigid cases like their ancestors were. Some products have parts that articulate relative to other parts, such as folding screens in some television receivers and the erectable screens of most "laptop" and "notebook" computers. Some products, such as audio devices, have soft padded cases in which they remain during use. Padded carrying cases, from which the device is removed for use, are frequently provided with the product or are available for separate purchase.

It is, accordingly, well-known to provide protection for portable electronic products by means of soft carrying cases, which receive a unitary product, i.e, a complete product contained in a hard case, or a product with an articulating case of hard parts (the computer example).

SUMMARY OF THE INVENTION

The present invention is a soft, foldable electronic product. Instead of encasing the components of the product in a hard, rigid case, the components are received in an envelope of soft flexible sheet material. The components are located in different portions of the envelope and are connected by conductors, and the envelope is foldable for carrying and storage and unfoldable for use. In some cases, the envelope is arranged so that a portion, such as a portion having a display screen, stands up when in use. The enclosure of the components in a soft foldable case imparts a pleasing tactile property to the product and also protects the components from impacts. The products are easy to carry in their folded condition and convenient to use when unfolded and, where applicable, erected for use. The need for a separate carrying case is eliminated. The soft envelope is also aesthetically pleasing. The invention lends itself to efficient manufacturing techniques by permitting the components to be made in modules that are easy to assemble into the envelope.

The invention is applicable to numerous electronic products, such as those mentioned above, and the term "unit" is, therefore, used herein to refer broadly to elements and assemblies of elements used in electronic products, such as electronic modules of all sorts, batteries, speakers, microphones, antennae, display screens, cassette drives, floppy disc drives, hard disc drives, keyboards, keypads, and interface receptacles or ports, such as those that permit earphones, power supplies, battery chargers, modems, memory devices, printers and the like to be connected to the product. The term "soft flexible sheet material" is used herein to refer to natural and artificial leather, flexible polymeric films, fabrics, velour, suede, and pile fabrics, any of which may, if desired, be laminated with a flexible polymeric foam or a batting throughout or in selected regions.

In particular, the present invention is a soft foldable consumer electronic product comprising a envelope having a top member and a bottom member, each member being of soft flexible sheet material. A first unit of the electronic product is received within a first portion of the envelope and affixed to one of the members thereof, and a second unit of the electronic product is received in a second portion of the envelope and affixed to one of the members thereof. At least one electrical conductor within the envelope extends from the first to the second portion of the envelope and electrically connects the units for operation of the product. The envelope is foldable such that the positions of the first and second portions relative to each other can be changed selectively. A releasable device may be provided for selectively holding the first portion of the envelope in a predetermined position relative to the second portion. More than one unit of the product can be included in a given portion or portions of the envelope.

Usually, but not always, one of the members in one of the portions of the envelope has an opening, and a part of the unit of the product received in that portion is received in the opening. In such cases, a first rigid case received within the first portion of the envelope contains a least some of the elements of the first unit, and a second rigid housing member is located outside of the envelope and affixed to the first housing member. The first and second housing members have portions engaging the envelope wall member along the perimeter of the opening in clamping relation, thereby affixing the first unit to the envelope member. For example, the part of the first unit that is received in the opening may be a visual display screen and the second housing member a frame around the screen. Or the first unit may include an audio speaker, and the second housing member is a cover having openings through which sound from the speaker is emitted. The top and bottom members are, preferably, joined together along the major portions of their perimeters. Usually, the envelope is substantially rectangular.

In some embodiments, the products will have at least one receptacle unit that is adapted to mate selectively with an accessory unit of the product externally of the envelope. The receptacle unit is affixed within the envelope adjacent its perimeter, and at least one conductor received within the envelope connects the receptacle unit to at least one of the first and second units. The envelope may be designed with one or more openings to provide access to one or more units that receive a separate, removable element, such as disc or cassette.

The present invention includes specific embodiments having advantageous features and characteristics in addition to those described above, namely, a television receiver and a notebook computer. Reference may be made to the descriptions below of those embodiments and to the accompanying drawings illustrating them. The embodiments are intended to be exemplary of the concept of "packaging" consumer electronic products in soft, foldable envelopes.

DESCRIPTION OF THE DRAWINGS

FIGS. 1 to 7 are views of the television receiver, as follows:

FIGS. 8 to 15 are views of the notebook computer, as follows:

DESCRIPTION OF THE EMBODIMENTS

The television receiver 10 comprises an envelope 12 composed of a bottom sheet 14 and a top sheet 16, both of soft flexible material. The sheets 14 and 16 are square and of the same size, and a pliable, soft leather is preferred for its good looks and feel and for durability. The sheets are hemmed and stitched around their entire perimeters before assembly with the electronic units. After the electronic units are installed, the top and bottom sheets 14 and 16 are joined by stitching along the perimeter (except where receptacles are exposed at the edge) to form the envelope 12.

The portions of the envelope 12 containing units of the receiver are quadrants, but they need not be physically defined and are not in the embodiment. One quadrant contains a unit in which consists of an LCD screen 20 and control switches 22 for turning the set on and off, for selecting channels, and for adjusting picture intensity, sound volume and the like, mounted on a rigid case 24 having a flat flange 26 around its perimeter and side and end walls 28 extending upwardly from its base. The top sheet of the envelope has a cutout 30 that matches the walls 28, which are received in the cutout. A frame 32 mates with the walls 28 of the case and clamps the flange of the case to the top sheet 16 around the cutout. An adhesive can be used to affix the case 24 and frame 28 to each other and to the sheet, or a snap-fit connection between the case 24 and the frame walls 28 can be provided. The frame carries pushbuttons 34 for operating the control switches 22.

The quadrant of the envelope diagonally opposite from the screen and control unit 18 contains a unit 40 of the receiver that includes an electronic module 42, batteries 44 and a speaker 45 mounted on a case 48, which can be similar in construction to the case 24 of the unit 18 and is received in a cutout 49 in the top sheet 16 of the envelope. The module 42 contains the detecting, processing and drive circuitry of the receiver. The units 18 and 40 are connected by a flat cable 46 containing the necessary conductors for conducting control and drive signals between the units, the cable, of course, being received within the case. A cover 50 fits over the case 48 and clamps the unit 40 to the top sheet. A portion of the cover is removable to provide access to the batteries. A curved groove 52 extends along the cover, for a purpose that is described below. Perforations in the cover facilitate the emission of sound from the speaker.

Figure 1:
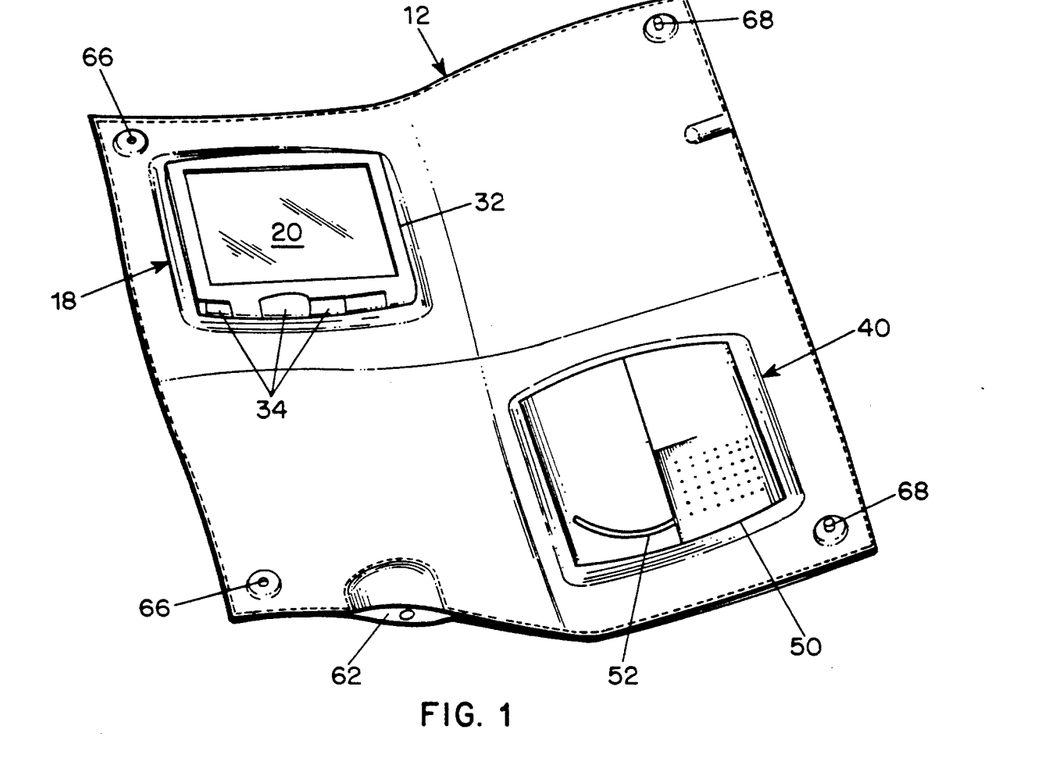
FIG. 1—pictorial of the top, unfolded;
    FIG. 2—pictorial fully folded;
    FIG. 3—pictorial erected;
    FIG. 4—pictorial erected;
    FIG. 5—exploded pictorial;
    FIG. 6—top plan, unfolded.
Figure 6:
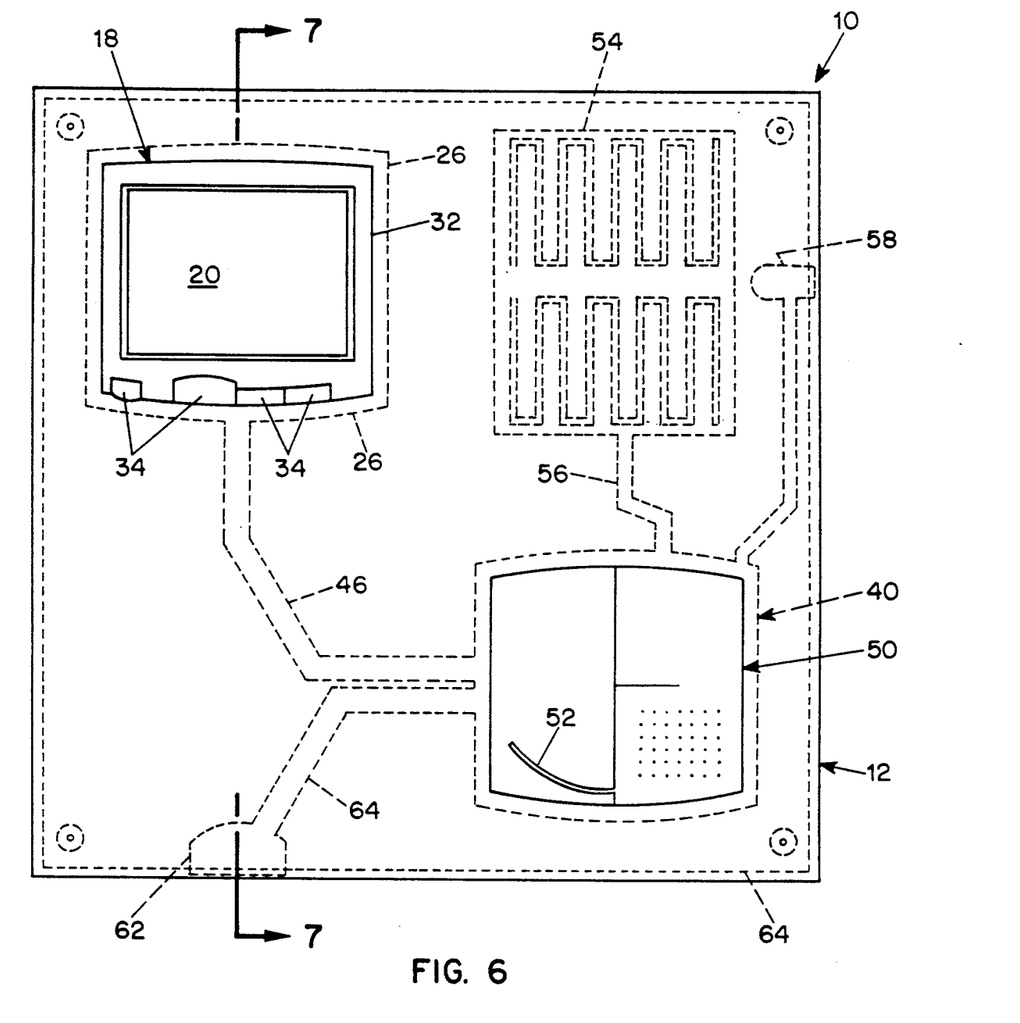
Figure 7:
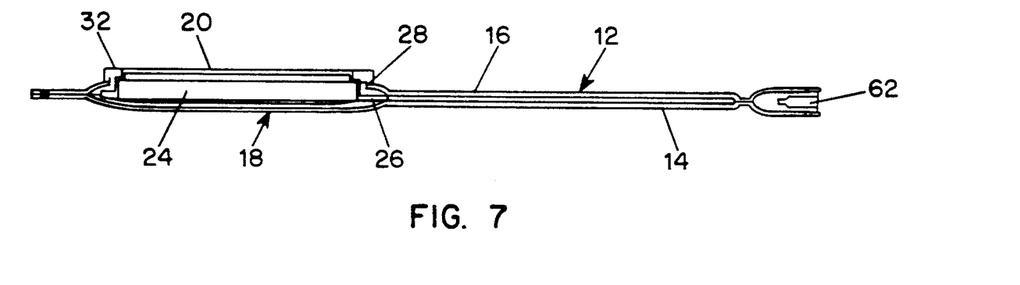
FIG. 7—side cross-sectional along lines 7—7 of FIG. 6.
Figure 8:
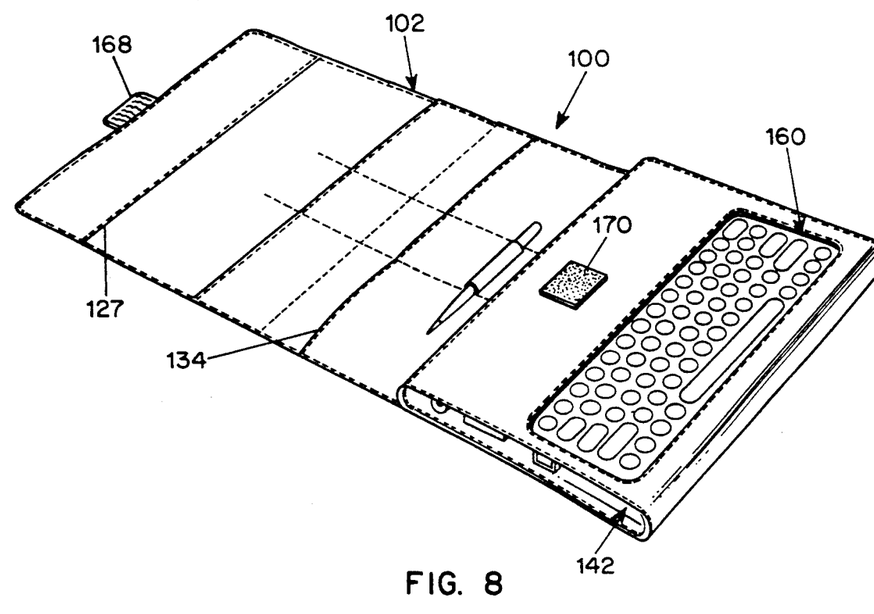
FIG. 8—pictorial of the top, unfolded.
Figure 9:
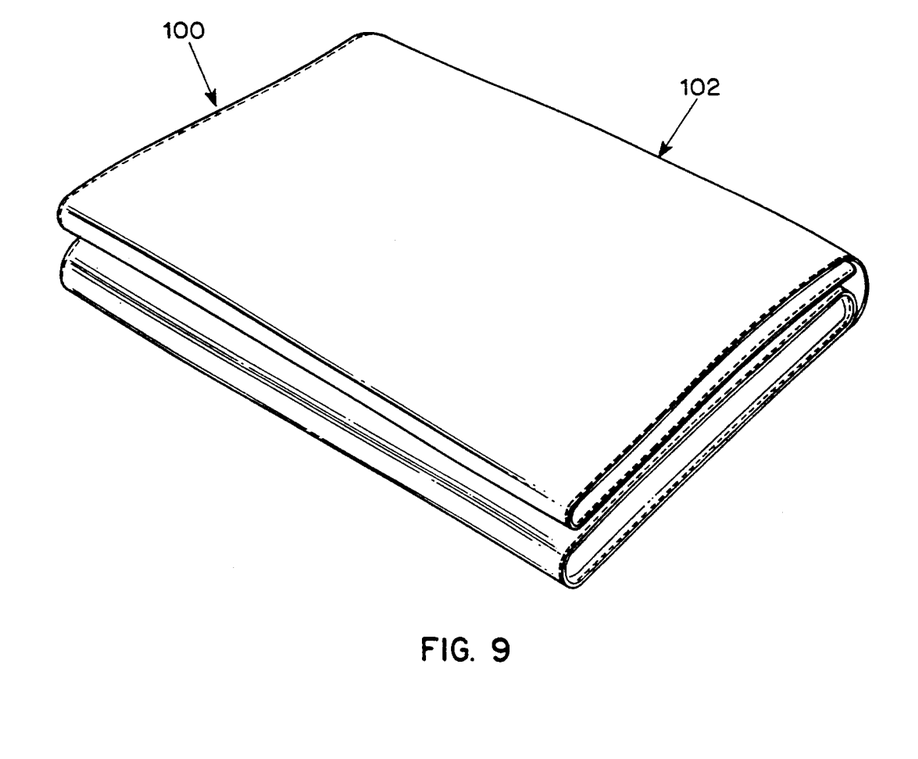
FIG. 9—pictorial, fully folded.
Figure 10:
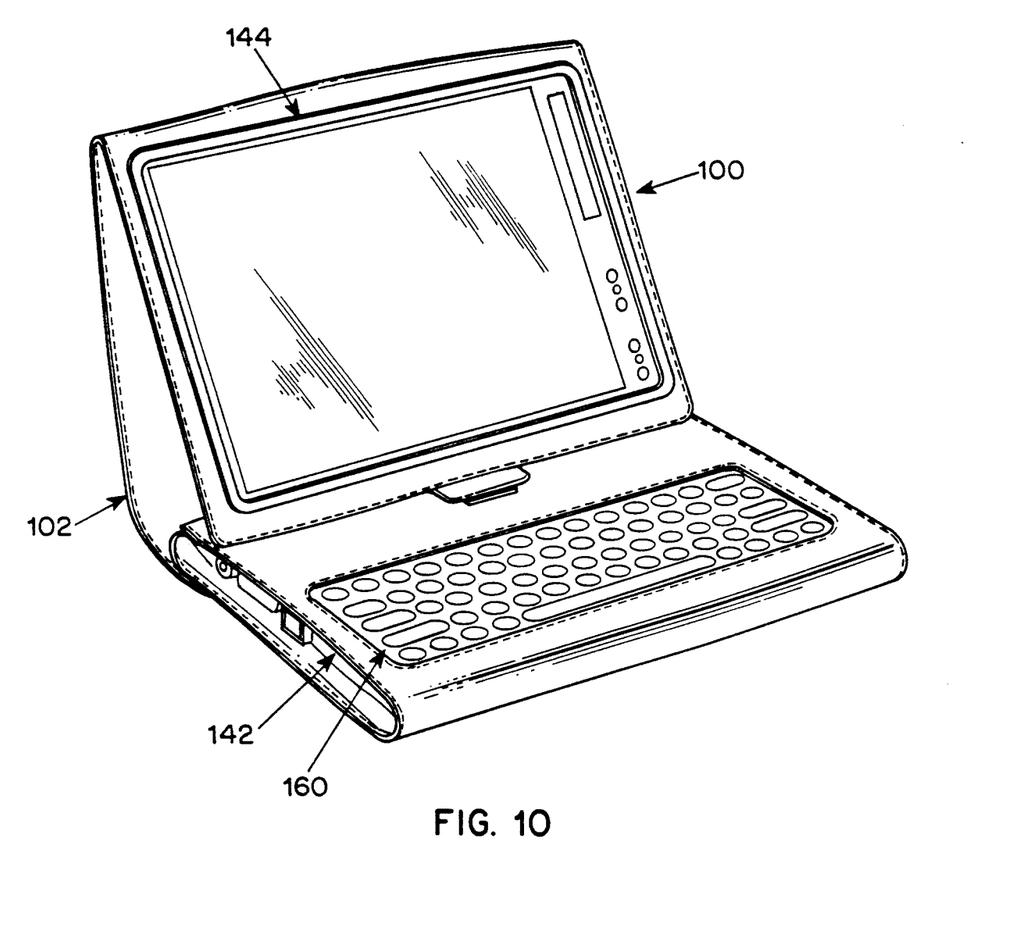
FIG. 10—pictorial erected.

A third quadrant of the envelope receives an antenna 54, which is connected by a flat cable 56 to the electronic module 42. Also installed in the third quadrant is a receptacle 58 for an earphone (not shown), the receptacle being suitably fastened to the sheets 14 and 16 upon final assembly, such as by an adhesive or double-faced adhesive tape. In this regard, double-faced adhesive tape is useful to fasten the cables in place in the envelope and can also be used to join the units 18 and 40 to the top sheet. The receptacle is connected to the electronic module 42 by a flat cable 60.

A receptacle 62 for connecting the set to an external power supply (not shown) is received within the envelope in the fourth quadrant and is connected to the electronic module 42 by a flat cable 64. As shown, the receptacles 58 and 62 open at the edge of the envelope. The stitching along the perimeter of the envelope that joins the sheets is, of course, omitted where the receptacles are exposed at the edge of the envelope.

Figure 2:
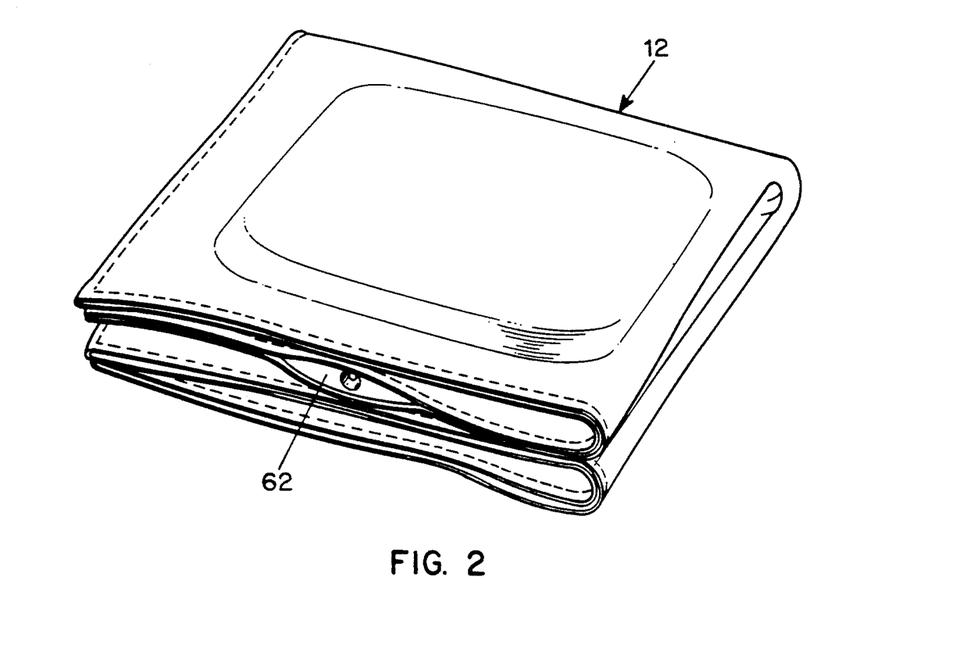

The receiver can be used in the fully open position shown in FIG. 1. The soft envelope is comfortable to handle and hold and is handsome to look at. When not in use, it can be folded in half. Mating snap fasteners (female 66 and male 68) are provided in the corners and can be done up to hold the envelope closed when folded in half for carrying or storage. When folded, the envelope is quite thin, inasmuch as the more massive quadrants, those containing the units 18 and 40, do not overlap but occupy separate halves of the folded product. If desired, the envelope can be folded again transversely to the half foldline, as shown in FIG. 2.

Figure 3:
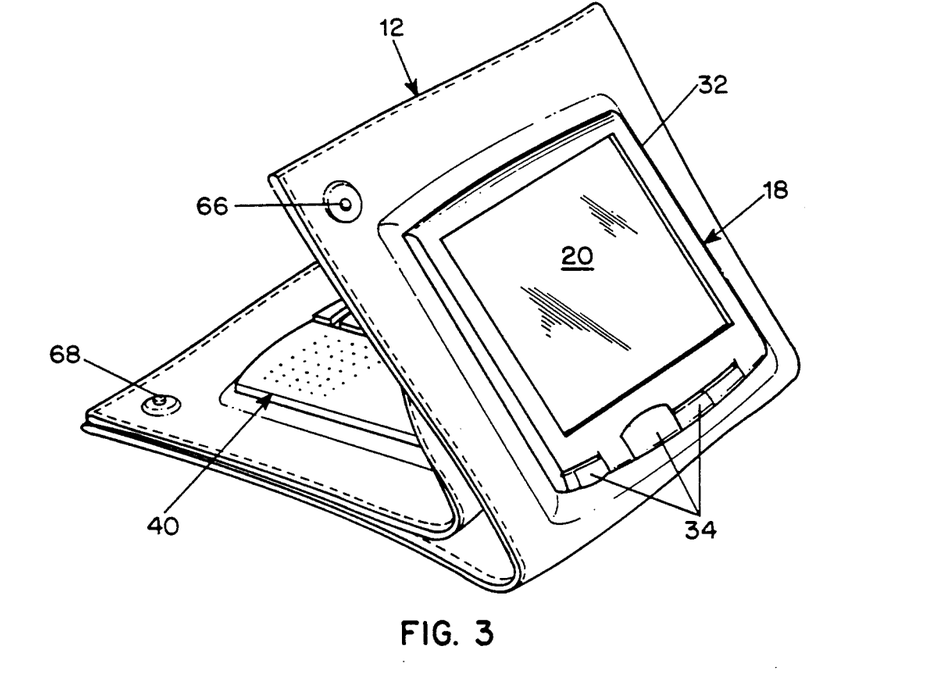
Figure 4:
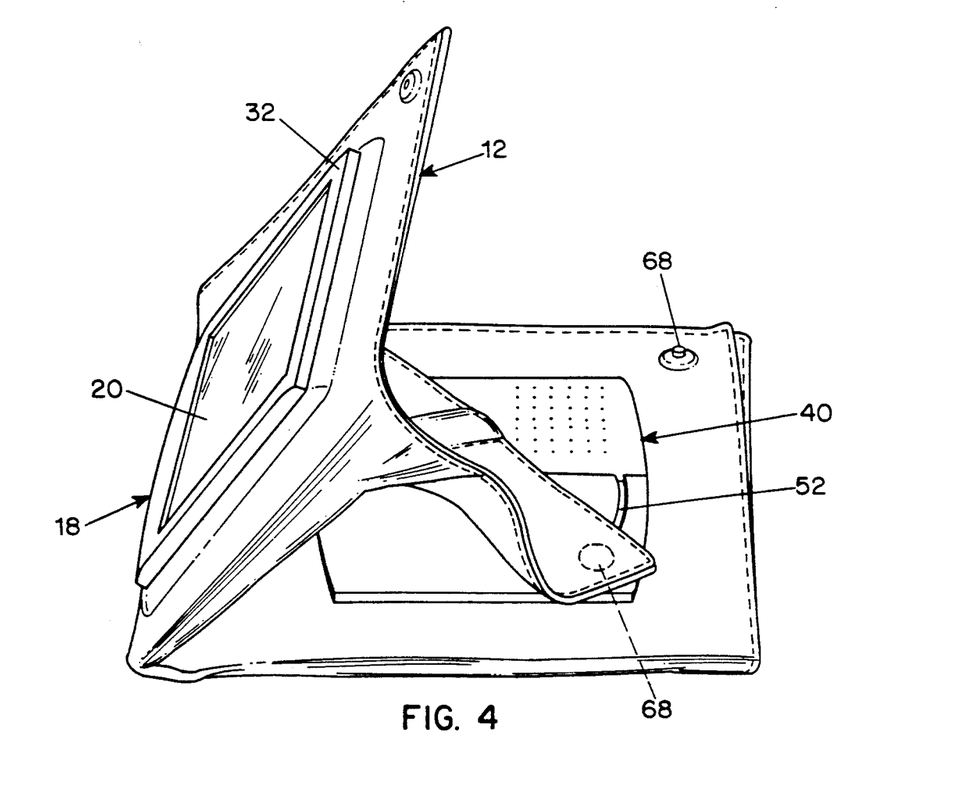
Figure 5:
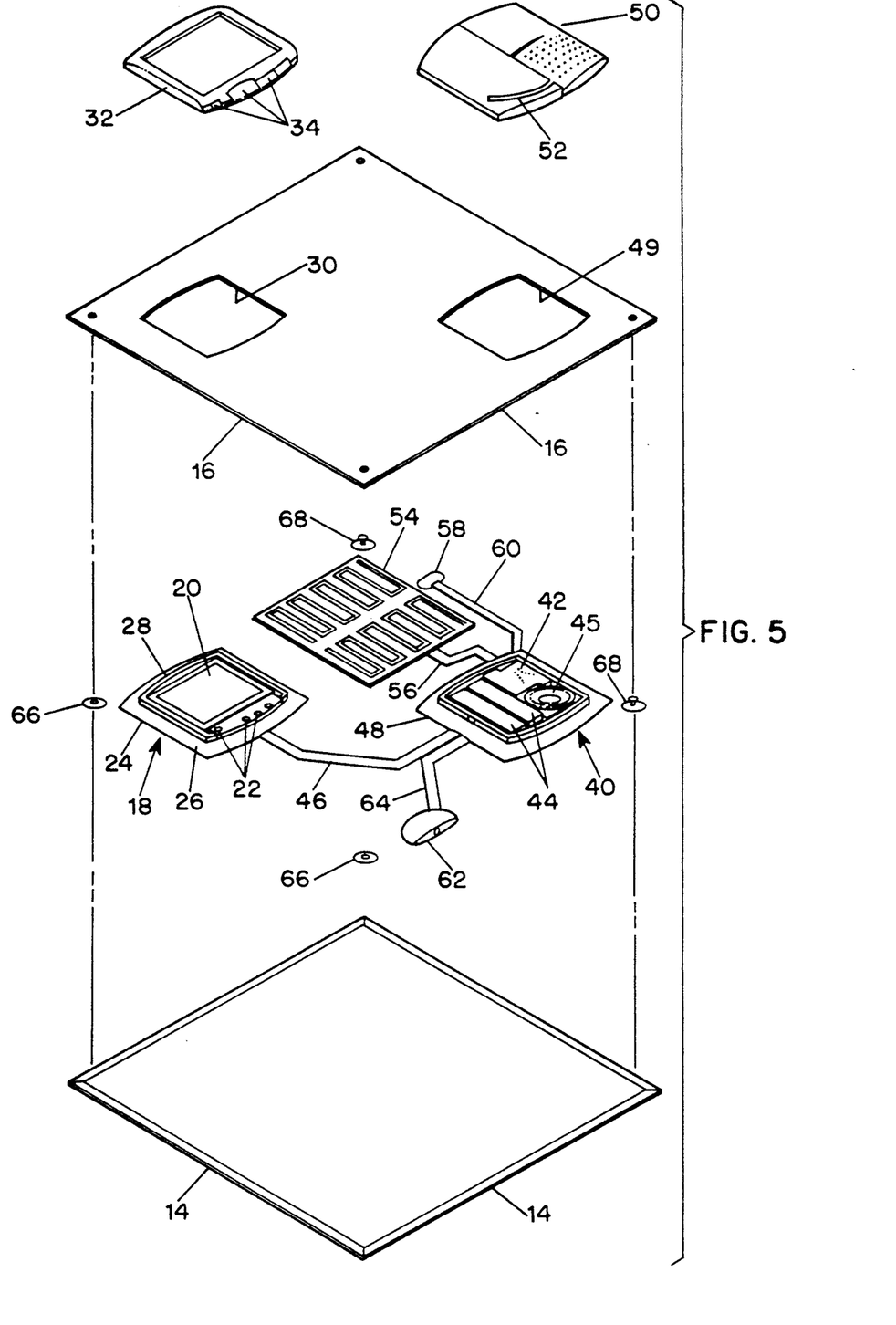

The TV receiver 10 can be erected for use by inserting the male snap 66 in the third quadrant, the one that contains the antenna, into the slot 52 in the cover 50 of the module 40 (see FIGS. 3 and 4). The third quadrant becomes a prop for the screen quadrant by folding diagonally behind the screen and holding it up. The receiver can be held or placed on a surface for viewing. The speaker faces upwardly, so the sound is not blocked.

While the flat antenna built into the third quadrant is convenient, it may provide inferior reception to a rod antenna. The receiver may, accordingly, be modified to have a telescoping rod antenna built into the envelope or as a plug-in accessory for alternate use. Other accessories (not shown) for the TV set include an earphone and a power supply that plugs into a household electric power plug.

Figure 14:
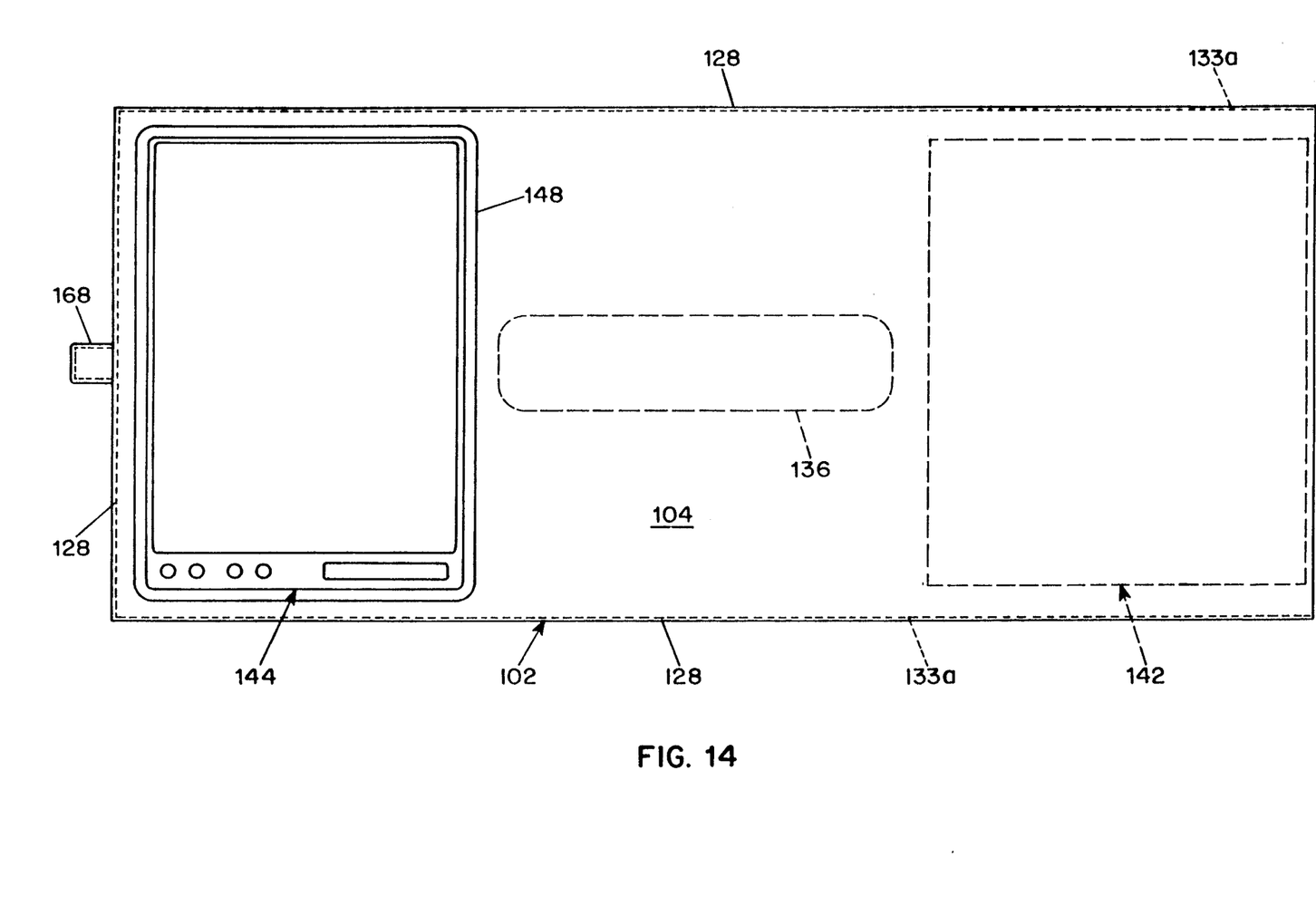
FIG. 14—bottom plan, unfolded.

The notebook computer 100 (FIGS. 8 to 15) has an elongated rectangular envelope 102 made of soft, flexible sheet material, a supple natural leather being preferred for its desirable appearance, feel, and durability. The envelope has a bottom member 104 and a top member 106, the top member 106 being composed of several sheet elements stitched together. One sheet element 108, which forms the bottom member, extends along the entire bottom of the envelope (in the unfolded condition) from one end (the left in FIG. 15) and turns up over the top at the other end, thus forming a part of the top member 106 of the envelope. A second sheet element 110 is joined to a narrow strip 112 by widthwise stitching 114. A zipper 116 or other releasable fastener connects the strip 114 to the sheet element 108 and, when undone, allows the envelope to be opened up by rolling back the part of the sheet element 108 that forms part of the top member 106 of the envelope. A third sheet element 118 partly underlies the element 110 and is stitched to it by crosswise stitching 120. A fourth sheet element 122 partly underlies the third element 118, is stitched to the third element by crosswise stitching 124, and extends to the end of the envelope. A fifth sheet element 126, which forms a pocket 107 for documents, overlies part of the sheet element 122 and is joined at the end and parts of the side edges of the envelope to the sheet elements 108 and 122 by the edge stitching 128 of the envelope. The edge stitching 128 runs along the screen end and along the sides of the envelope from the screen end to the stitch line 114 and joins the top and bottom members 104 and 106. Stitch lines 133a (FIGS. 11 and 14) along the side edges are for hems along the edges of the sheet element 108. Stitching 133b is used along hems at the edges of various elements of the envelope, as shown.

Lengthwise stitch lines 130 and 132 in the top member (see FIG. 11) form the sides of pockets 134 for "floppy" diskettes between the overlapping portions of the sheet elements 118 and 110 and 122 and 118. The stitch lines 130 and 132 also secure a strip 136 of flexible material to the underside of the top member of the envelope. The strip 136 forms with the top member a sleeve that is open at both ends and receives a stiffener 138 (FIG. 14), which may be of a rigid polymeric material, and a flat cable 140 having the electrical conductors required for connecting a computer processor and disc drive unit 142 to a display screen 144.

Figures 11, 13:
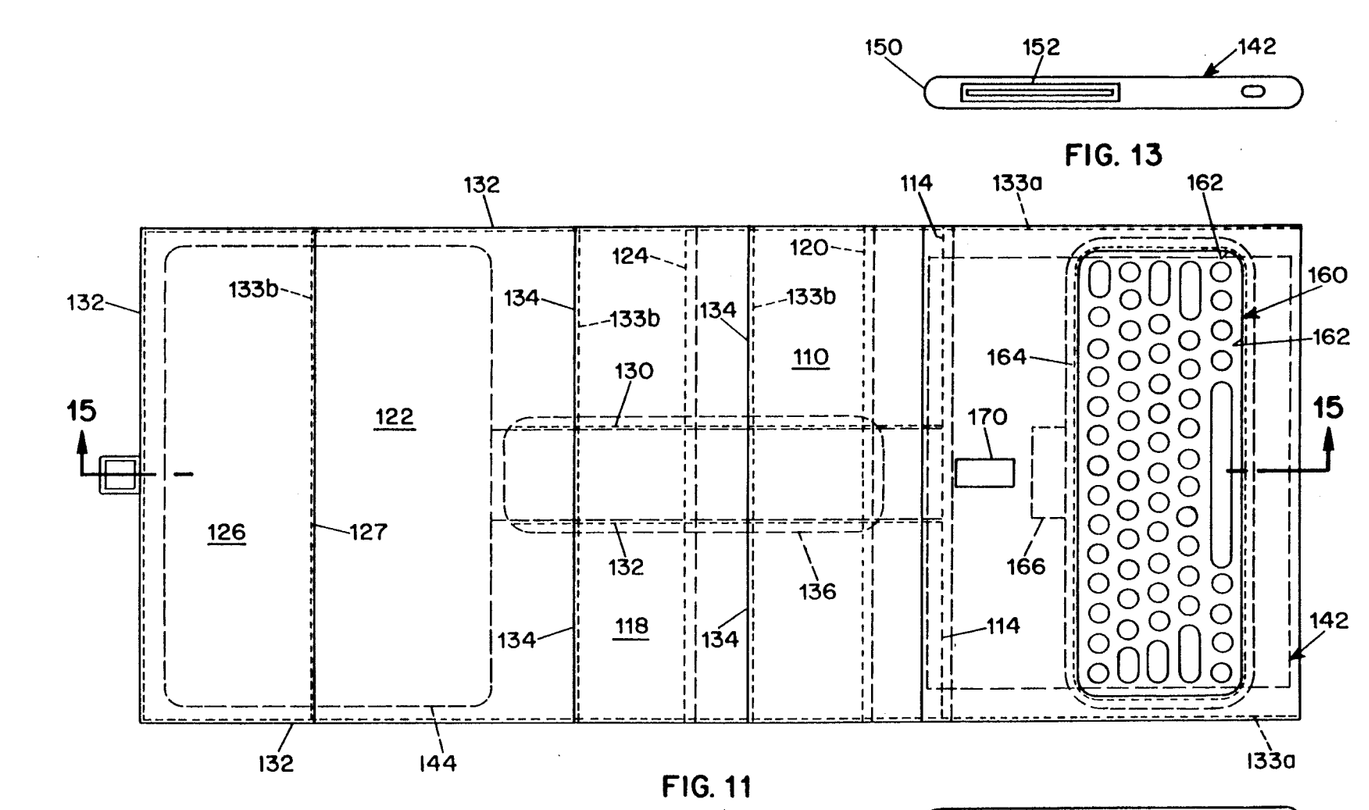
FIG. 11—top plan, unfolded.
FIG. 13—right side fragmentary, keyboard and processor portion.
Figure 12:
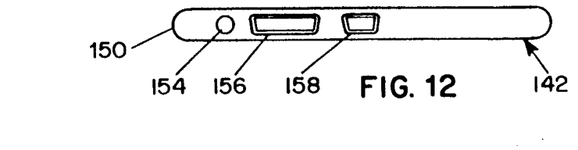
FIG. 12—left side fragmentary, keyboard and processor portion.
Figure 15:
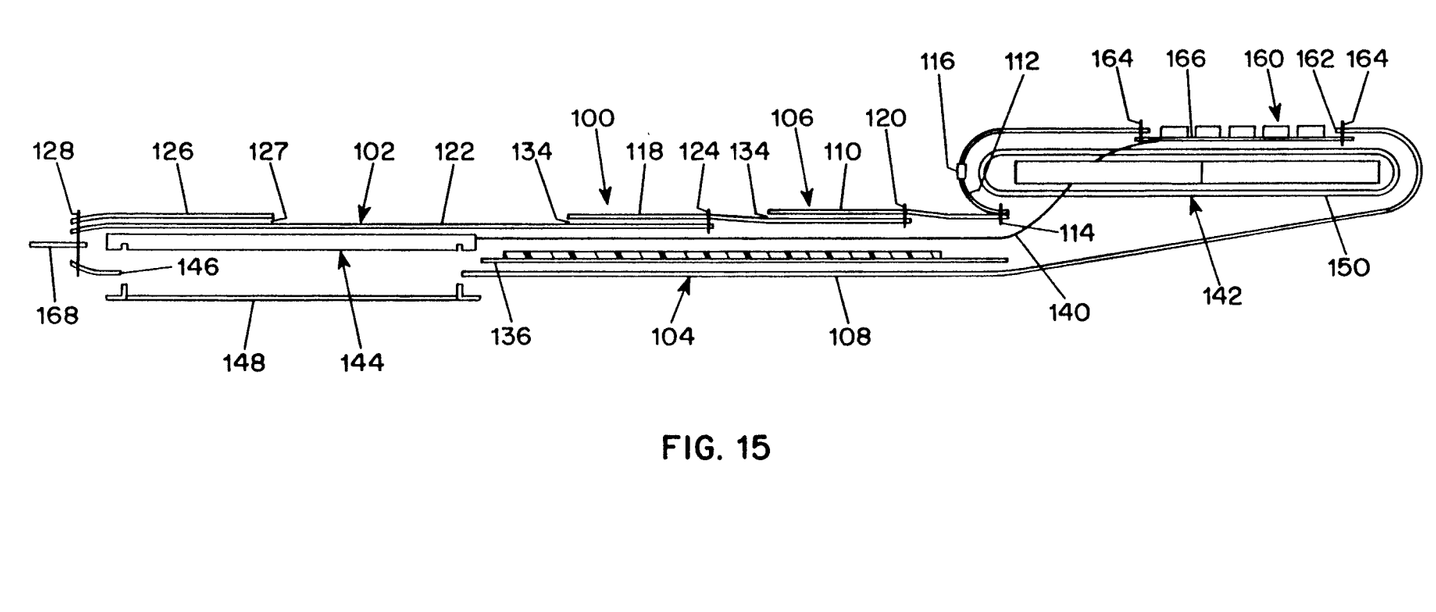
FIG. 15—side cross-section along lines 15—15 of FIG. 11.

The display screen 144, which may be a conventional LCD screen, is received in a portion of the envelope adjacent one end having a length of about on third of the total length of the envelope. Its viewing face is received in a cutout 146 in the bottom member 104 of the envelope. The perimeter of the case of the screen 144 is overlapped by the member 104, and a frame 148 is attached to the case of the screen on the outside of the member, thus to clamp the screen to a band of the member 104 along the edge of the cutout. An adhesive or a double-faced adhesive tape can be used to secure the screen and frame to the envelope member around the cutout.

A portion of the envelope at the end opposite from the screen 144 and of a length equal to about on third of the length of the envelope receives the processor and disc drive unit 142. The unit has a rigid case 150 that contains the computer processor, a hard disc drive, a floppy disc drive 152 (FIG. 13), and a battery. These components are conventional, well-known and are not shown in detail in the drawings The portion of the envelope that receives the unit 142 is open at each side to provide external access for inserting floppy discs into the drive 152 and for connecting other components (external power supply, modem, printer and the like) to a receptacle 154 and ports 156, 158 at the ends of the unit (see FIGS. 12 and 13). The unit is attached to the case by strips of double faced adhesive tape (not shown) but can be retained in the envelope in any other suitable manner.

A keyboard 160, which is preferably of the bubble switch type so that will be very thin, is received in a cutout 162 and is attached to the upper member of the envelope by stitching (stitch line 164) a rim portion of polymeric material that runs along the perimeter of the keyboard to the sheet element 108 of the envelope. The keyboard 160 is connected to the processor by a flat cable 166.

Thin sheets of flexible polymeric foam (not shown) can be laminated (preferred) to portions of the members of the envelope or (less desirably) adhered to portions of the cases of the units to enhance the softness of the envelope. For example foam sheets on the top and bottom and along the front edge of the processor portion of the computer make the envelope softer to the touch. Foam sheets also protect the unit by cushioning impacts to it. By having the foam in the upper member around the keyboard thick enough to locate the upper surface of the envelope above the keyboard such that the key board is recessed, contact between the keyboard and the screen is prevented when the envelope is closed. Relatively thick foam on the bottom of the processor/disc drive portion of the envelope enhances the softness and comfort of the computer when it held on the user's lap.

The computer comprises, then, three operating units, the screen 144, the processor and disc memory unit 142 and the keyboard 160, which are connected by cables 140 and 166. Each of these units is, of course, manufactured as a separate unit. The envelope is produced by die cutting the various elements and stitching them together in the manner previously described. The units are readily installed in the finished envelope. With the zipper 112 undone, the portion of the sheet element 108 that receives the keyboard can be laid out for stitching the keyboard to it. The screen can be slid into the envelope from the open end adjacent the zipper, and the cable 140 is fished through the sleeve before the frame 148 is attached to the screen. The unit 142 is set in place on the envelope element 108. The cables 140 and 166 are connected between the operating units, plugs being provided on the cables to facilitate assembly and to permit the units to be replaced, if necessary. The envelope is then closed by folding over the top portion of the sheet element 108 and doing up the zipper.

When the envelope is opened out (FIG. 8), the user has access to the documents and diskettes in the pockets. The computer is set up for use (FIG. 10) by folding the screen portion over the center portion of the envelope and attaching a tab 168 on the screen end of the envelope, which tab has a piece of one element of a hook and loop cloth fastener ("Velcro") on it, to a piece 170 of the other element of the fastener on the top member of the envelope adjacent the keyboard. The screen is propped up for viewing by the stiffener 136 in the center portion of the envelope. The "Velcro" material permits varying the fastening point for the screen to adjust the angle of the screen for comfortable viewing by the user. For storing or carrying the computer, the fastener 168-170 is undone, the screen is folded down over the center portion of the envelope, and the keyboard is folded down over the face of the screen (see FIG. 9).

I claim:

1. A soft foldable consumer electronic product comprising an envelope having a top member and a bottom member joined to each other along at least portions of their perimeters, each member being of soft flexible sheet material, a first unit of the electronic product received within a first portion of the envelope and affixed solely to one of the members thereof in said portion, leaving the other member unattached in said first portion so that said other member retains its softness and flexibility, the first unit including an audio speaker, a rigid housing member containing the speaker and received in the envelope and having a portion positioned in an opening in one of the envelope members, and a cover having openings through which sound from the speaker is emitted, the cover being disposed in the opening and located outside of the envelope, the housing member and cover being affixed to the envelope member along the perimeter of the opening in clamping relation and thereby affixing the first unit to the envelope member, a second unit of the electronic product received in a second portion of the envelope and affixed solely to one of the members thereof in said second portion, leaving the other member unattached in such portion so that said other member retains its softness and flexibility, and at least one conductor within the envelope extending from the first to the second portion and connecting the first and second units to electrically connect them for operation of the product, the envelope being foldable such that the positions of the first and second portions relative to each other can be changed selectively.

2. A soft foldable television receiver comprising an envelope having a top member and a bottom member, each member being of soft flexible sheet material and the members being substantially rectangular and joined to each other along the major portions of their perimeters to define the envelope, a visual display screen received within a first portion of the envelope and affixed within an opening in one of the members thereof, the screen including a rigid housing member received within the envelope, a frame received outside of the envelope and extending along the perimeter of the screen, the housing member and frame being affixed to said one member of the envelope in clamping relation and thereby affixing the screen to the envelope member, an electronic module having television signal detecting, processing and driving circuitry, and a battery and an audio speaker received in a second portion of the envelope and affixed to one of the members thereof, at least one conductor within the envelope extending from the first to the second portion and connecting the screen and electronic module to electrically connect them for operation of the receiver, at least one receptacle unit of the product receiver adapted to mate selectively with an accessory unit of the receiver externally of the envelope, the receptacle unit being affixed within the envelope adjacent its perimeter, and at least one conductor received within the envelope and connecting the receptacle unit to the electronic module, the envelope being foldable such that the positions of the first and second portions relative to each other can be changed selectively.

3. A television receiver according to claim 2, wherein the electronic module, battery and speaker are received by a rigid case member received in the second envelope portion, one of the members of the envelope has an opening in the second portion, a portion of the case member is received in the opening, and further comprising a rigid cover member attached to the portion of the case member that is received in the opening.

4. A television receiver according to claim 3, wherein the case member and cover member have portions engaging the envelope member along the perimeter of the opening in clamping relation and thereby affixing the first unit to the envelope member.

5. A television receiver according to claim 2 wherein the top and bottom members are joined together along the major portions of their perimeters to define the envelope.

6. A television receiver according to claim 5 wherein the top and bottom members are substantially rectangular.

7. A television receiver according to claim 6 wherein the first and second portions of the envelope are diagonally opposite quadrants.

8. A television receiver according to claim 7 and further comprising an antenna received in a third quadrant of the case and conductors in the envelope connecting the antenna to the electronic module.

9. A soft foldable computer comprising an envelope having a top member and a bottom member, each member being of soft flexible sheet material and the members being substantially rectangular and joined to each other along the major portions of their perimeters to define the envelope, the envelope having a first portion at one end, a second portion at the other end and a third portion between the first and second portions, the first, second and third portions being of substantially the same size, a visual display screen received within a first portion of the envelope and affixed within an opening in one of the members thereof, the screen including a rigid housing member received within the envelope, a frame received outside of the envelope and extending along the perimeter of the screen, the housing member and frame being affixed to said one member of the envelope in clamping relation and thereby affixing the screen to the envelope member, a processor, a disc drive and a keyboard received in a second portion of the envelope and affixed to one of the members thereof, at least one conductor within the envelope extending from the first to the second portion and connecting the screen and the processor to electrically connect them for operation of the computer, at least one receptacle unit of the computer adapted to mate selectively with an accessory unit of the computer externally of the envelope, the receptacle unit being affixed within the envelope adjacent its perimeter, and at least one conductor received within the envelope and connecting the receptacle unit to processor, the envelope being foldable such that the positions of the first and second portions relative to each other and to the third portion can be changed selectively.

10. A computer according to claim 9 wherein the screen is positioned in an opening in the bottom member of the envelope and the keyboard is positioned in an opening in the top member.

11. A computer according to claim 10 wherein the envelope is adapted to be folded along the junctures between the portions into a sandwich in which the first portion is located between the second and third portions and the bottom members of the case are presented externally of the sandwich.

12. A computer according to claim 10 wherein the envelope is adapted to be erected for use of the computer with the first portion extending generally upwardly from the juncture of the second and third portions and supported by the third portion, and further comprising means on the first and second portions of the envelope for joining the free edge of the first portion to the second portion.

13. A computer according to claim 10 wherein the top member of the envelope in the third portion has pockets adapted to receive removable member devices of the computer, such as floppy discs or memory cassettes.

* * * * *